United States Patent Office 3,808,258
Patented Apr. 30, 1974

3,808,258
PROSTANOIC ACID DERIVATIVES AND
PREPARATION THEREOF
Jehan F. Bagli, Valois Gardens, Quebec, and Tibor Bogri,
Montreal, Quebec, Canada, assignors to Ayerst, Mc-
Kenna & Harrison, Limited, Montreal, Quebec, Canada
No Drawing. Original application Oct. 22, 1968, Ser. No.
769,750, now abandoned. Divided and this application
Jan. 20, 1971, Ser. No. 108,209
Int. Cl. C07c 69/74
U.S. Cl. 260—468 G                        1 Claim

ABSTRACT OF THE DISCLOSURE

There are disclosed herein 9,15-dioxoprostanoic acid, lower alkyl esters thereof, and homologs thereof, a process to prepare those compounds, as well as a process for preparing 9,15-dihydroxyprostanoic acid, lower alkyl esters thereof, and homologs thereof. The compounds possess hypotensive and antihypertensive activities, and methods for their use are also disclosed.

This application is a division of our prior, copending application, Ser. No. 769,750, filed Oct. 22, 1968, now abandoned.

BACKGROUND OF THE INVENTION

This invention relates to 9,15-dioxoprostanoic acid, to lower alkyl esters thereof, and to homologs thereof, as well as to a process for preparing said compounds and to a process for preparing 9,15-dihydroxyprostanoic acid, lower alkyl esters thereof, and homologs thereof.

The compounds of this invention are structurally related to the natural prostaglandins which are more fully described in their biological activities and chemical structures in the Proceedings of the Second Nobel Symposium, Stockholm, June 1966, and in the review paper by U. Axen published in Annual Reports in Medicinal Chemistry, Academic Press, p. 290, New York and London, 1968. The prostaglandins occur in nature only in very small quantities, and the processes for their extraction and purification from natural sources are laborious and inefficient. It is an object of this invention to provide compounds structurally related to the naturally occurring prostaglandins by synthetic means.

SUMMARY OF THE INVENTION

The compounds of this invention may be represented by the Formula I

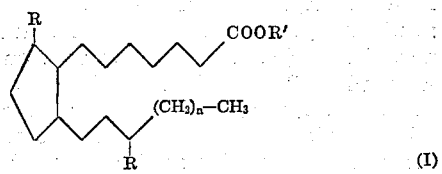

(I)

in which R represents H(OH) or O (ketonic oxygen), R' represents hydrogen or a lower alkyl group of from 1 to 3 carbon atoms, and $n$ represents an integer of from 1 to 6. The process of this invention is exemplified in the flow sheet shown below, in which R' and $n$ have the same significance as defined above.

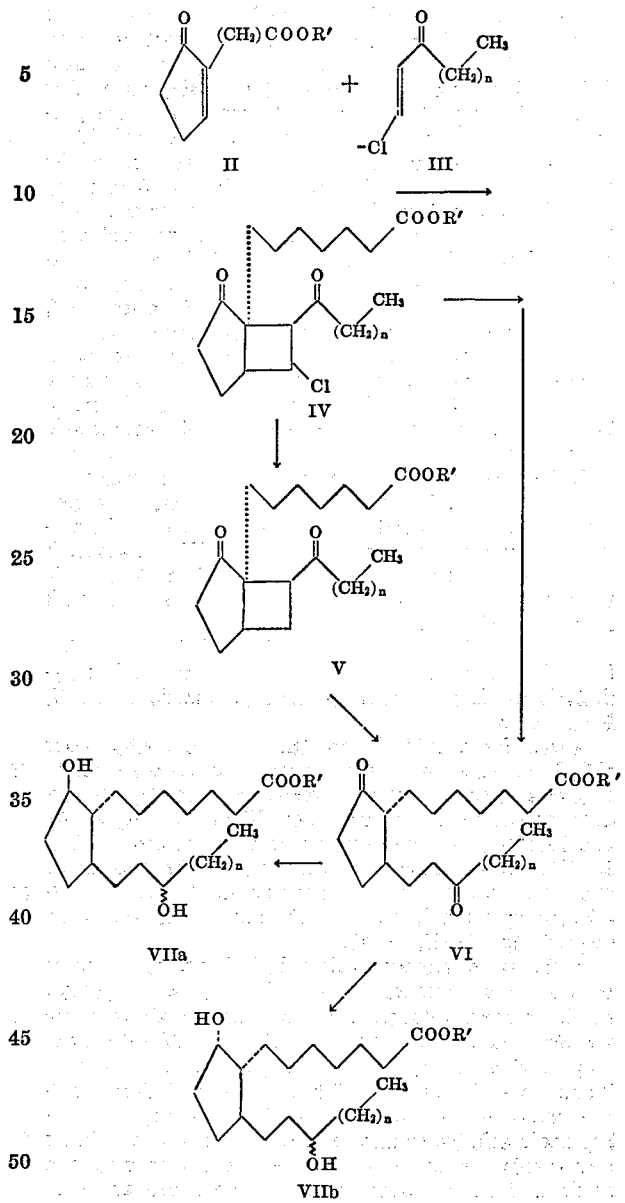

DETAILED DESCRIPTION OF THE INVENTION

Our preferred starting material for the preparation of 9,15 - dioxoprostanoic acid is 2 - (6-carbomethoxyhexyl)-cyclopent-2-en-1-one. The preparation of the corresponding 2-(6-carboxyhexyl)cyclopent-2-en-1-one is described in our U.S. patent application Ser. No. 485,935, filed Sept. 8, 1965. In accordance with the method described therein, the latter compound is obtained by condensing the known compound ethyl 7-bromo-1-heptanoate with the equally known potassium salt of ethyl cyclopentanone carboxylate, by refluxing a mixture of the two compounds in an inert solvent, to obtain ethyl 2-(6-carbethoxyhexyl)-cyclopentan-1-one-2-carboxylate; treating the latter compound with elementary bromine in chloroform solution to obtain ethyl 2 - (6-carbethoxyhexyl)-5-bromocyclopentan-1-one-2-carboxylate; treating the latter compound with a mineral acid, preferably 20% sulfuric acid, to obtain 2-(6-carboxyhexyl)-cyclopent-2-en-1-one; and treating the latter compound with methanol and p-toluenesulfuric acid to obtain 2-(6-carbomethoxyhexyl)-cyclopent-2-en-1-one (II) $R=CH_3$. For the purposes of this invention other lower alkyl esters of the above acids, such as the ethyl or propyl esters, may also be used.

In a preferred procedure for the preparation of 9,15-dioxoprostanoic acid and of its derivatives, the last-named compound of Formula II is reacted with a vinyl ketone of the Formula III containing from 6 to 11 carbon atoms. If it is desired to prepare 9,15-dioxoprostanoic acid (I,R=O(ketonic oxygen), $n=4$), the starting material is 1-chloro-3-oxo-oct-1-ene, prepared according to the general procedure described in Organic Syntheses, vol. 32, p. 27 (1952). The reaction is preferably carried out in the absence of a solvent, by irradiation with a 500W mercury vapor lamp with Pyrex filter and water cooling at 20–40° C. for 24 to 48 hours. Evaporation under reduced pressure followed by purification, for example by chromatography, yields 7 - hexanoyl - 6 - chloro-2-oxobicyclo-[3,2,0]-heptane-1-heptanoic acid methyl ester (IV, $R=CH_3$, $n=4$). The latter compound, treatment with approximately 20 parts of zinc and acetic acid at temperatures between 60° C. and the boiling point of the mixture of several hours, preferably overnight yields a mixture of 7-hexanoyl-2-oxobicyclo-[3,2,0]-heptane-1-heptanoic acid methyl ester and 9,15-dioxoprostanoic acid methyl ester (VI, $R=CH_3$, $n=4$) which is separated, preferably by chromatography. Using approximately 30 parts of zinc per part of Compound IV it is possible to obtain predominantly the compound of Formula VI. However, it is also possible to convert the compound of Formula V to that of Formula VI by an additional treatment with zinc and acetic acid.

The 9,15-dioxoprostanoic acid methyl ester (VI, $R=CH_3$) thus obtained may be subjected to alkaline hydrolysis to yield the corresponding prostanoic acid (VI, $R=H$, $n=4$).

Alternatively, 9,15-dioxoprostanoic acid methyl ester (VI, $R=CH_3$, $n=4$) is reduced with sodium borohydride to give a mixture of stereoisomeric alcohols, 9$\beta$,15$\xi$-dihydroxyprostanoic acid methyl ester (VIIIa, $R=CH_3$, $n=4$) and 9$\alpha$,15$\xi$-dihydroxyprostanoic acid methyl ester (VIIb, $R=CH$, $n=4$). Alkaline hydrolysis of the last-named compounds yields the corresponding 9$\beta$,15$\xi$- and 9$\alpha$,15$\xi$-dihydroxyprostanoic acids of Formulae VIIa and VIIb, respectively ($R=H$, $n=4$).

In the same manner as described above, but using as the chlorovinyl ketones chlorovinyl methyl, ethyl, propyl, butyl, or hexyl ketones, and proceeding as above, there are obtained the compounds of Formula IV ($R=$lower alkyl, and $n=1,2,3,5$ or 6), viz, 7-acetyl-, 7-propionyl-, 7-butanoyl-, 7-pentanoyl-, 7-heptanoyl-, and 7-octanoyl-6 - chloro - 2 - oxobicyclo -, [3,2,0] - heptane - 1 - heptanoic acid lower alkyl esters, respectively. The latter compounds are converted by treatment with zinc and acetic acid in the same manner as described above to mixtures of the corresponding compounds of Formula V ($R=$lower alkyl, $n=1,2,3,5$, or 6) viz, 7-acetyl-, 7-propionyl-, 7-butanoyl-, 7-pentanoyl-, 7-heptanoyl-, or 7-octanoyl - 2 - oxobicyclo - [3,2,0]-heptane-1-heptanoic acid lower alkyl esters with the respectively corresponding compounds of Formula VI ($R=$lower alkyl, $n=1,2$, 3,5, or 6) viz, the trans-lower alkyl esters of 2-(6-carboxyhexyl)-3-oxobutyl-, 3-oxopentyl-, 3-oxohexyl-, 3-oxoheptyl-, or 3-oxononyl-, or 3-oxodecyl-cyclopentan-1-one. The last-named compounds may be reduced in the same manner as described above to yield the corresponding compounds of Formulae VIIa and VIIb ($R=$lower alkyl, $n=1,2,3,5$, or 6), viz, trans - 2 - (6-carboxyhexyl)-3-(3$\xi$- hydroxybutyl)-, (3$\xi$ - hydroxypentyl)-, (3$\xi$-hydroxyhexyl)-, (3$\xi$ - hydroxyheptyl-, (3$\xi$ - hydroxynonyl)- or (3$\xi$ - hydroxydecyl)-cyclopentan-1$\alpha$-and 1$\beta$-ol, respectively.

The compounds prepared by the process of this invention have been found to possess interesting pharmacological properties. More particularly, these compounds, in standard pharmacological tests, especially in a modification of the tests for determining hypotensive activities described in "Screening Methods in Pharmacology," Academic Press, New York and London 1965, page 146, using the cat in urethane-chloralose anaesthesia as the test animal and measuring mean arterial blood pressure before and after intravenous administration of the compounds, have exhibited utility as hypotensive agents.

Moreover, the compounds of this invention, when tested in the renal hypertensive rat prepared by the method of A. Grollman described in Proc. Soc. Exp. Biol. Med., vol. 7, p. 102 (1954), and measuring blood pressure by the method described by H. Kersten in J. Lab. Clin. Med., vol. 32, p. 1090 (1947), have exhibited utility as antihypertensive agents.

When the compounds of this invention are employed as hypotensive agents in warm-blooded animals, for example, in cats or rats, alone or in combination with pharmacologically acceptable carriers, their proportions are determined by their solubilities, by the chosen route of administration, and by standard biological practice. For example, the compounds of this invention are preferably administered parenterally in the form of sterile solutions thereof which may also contain other solutes, for example, sufficient sodium chloride or glucose to make the solution isotonic.

The dosages of the present hypotensive and antihypertensive agents will vary with the forms of administration and the particular compounds chosen. Furthermore, they will vary with the particular hosts under treatment. Generally, treatments are initiated with small dosages substantially less than the optimum doses of the compounds. Thereafter, the dosages are increased by small increments until the optimum effects under the circumstances are reached. In general, the compounds of this invention are most desirably administered at a concentration level that will generally afford effective results without causing any harmful or deleterious side effects and preferably at a level that is in a range of from about 0.1 mg. to about 10.0 mg. per kilo, although as aforementioned variations will occur. However, a dosage level that is in range of from about 0.5 mg. to about 5 mg. per kilo is most desirably employed in order to achieve effective results.

The following examples will illustrate this invention.

EXAMPLE 1

7-hexanol-6-chloro-2-oxobicyclo-[3,2,0]-heptane-1-heptanoic acid methyl ester (IV)

A solution of 2-(6-carbomethoxyhexyl)-cyclopent-2-en-1-one (4.52 g.) in 1-chloro-3-oxooct-1-ene is irradiated with 500 watt mercury arc (with Pyrex filter) over a period of 28 hours, under nitrogen atmosphere. The reaction is stopped and the mixture is fractionally distilled to remove unchanged chlorovinyl ketone (B.P., 80–83° C./12 mm.), and cyclopentenone (bath temperature 170° C./1.5 mm.) The residue is chromatographed on a column of silica gel (180 g.) in benzene. Elution with 2% etherbenzene yields a product (1.6 g.). A rechromatography on silica gel yields the title compound as an oil which is homogenous by thin-layer and gas-liquid chromatography and is characterized by analysis, by N.M.R. spectrography $\delta 4.50$ (1H, quartet, on carbon bearing chlorine) $\delta 3.17$ (1H, $\alpha$ to ketone, on cyclobutane) $\delta 3.65$ (3H, methoxyl) $\delta 0.88$ (3H, terminal methyl) and by mass spectrography M-36: 348; M-(36+31): 317, M-(36+99:) 249 m./c.

EXAMPLE 2

7-hexanoyl-2-oxobicyclo[3,2,0]-heptane-1-heptanoic acid methyl ester (V)

A solution of 7-hexanoyl-6-chloro-2-oxobicyclo-[3,2,0]-1-heptanoic acid (0.454 g.) in glacial acetic acid (30 ml.) is refluxed with stirring overnight, in presence of zinc (2.76 g.). The mixture is filtered and the solvent removed. The residue is taken up in ether, washed with water, dried, and the solvent is removed, to yield an oily residue, a mixture of Compounds III and IIIa, which is separated by chromatography as silica gel. The title compound is eluted with 5 percent ether/benzene and is obtained in the first fractions with $$\gamma_{max.}^{CHCl_3} \ 1700, 1725 \text{ cm.}^{-1}$$

it is further characterized by mass spectrography (M: 350 m./c.; M–31: 319 m./c.; M–99: 251 m./c.; M–71: 271 m./c.; and by N.M.R. $\delta$3.65 (3H, methoxyl); $\delta$3.05 (1H, $\alpha$ to carbonyl on cyclobutane) $\delta$0.88 (3H, terminal methyl).

EXAMPLE 3

9,15-dioxaprostanoic acid methyl ester (VI)

To a solution of 7 - hexanoyl - 6 - chloro-2-oxobicyclo-[3,2,0]-heptane-1-heptanoic acid methyl ester (0.5 g.) in acetic acid (30 ml.) is added zinc dust (7.5 g.) and the mixture is stirred overnight, at reflux temperature, cooled, and filtered. The residue is washed with ether, and the solvent is completely removed. The residue is taken up in ether, washed with water, dried, and the solvent is removed. The residue is chromatographed on silica gel (23.6 g.) and the later eluates with 5% ether/benzene yield the title compound as a homogenous product $$\gamma_{max.}^{CHCl} \ 1726, 1708 \text{ cm.}^{-1}$$

Alternatively, the title compound may also be prepared as follows.

To a solution of 7-hexanoyl-2-oxomethyl ester (0.35 g.), obtained as described in Example 2, in acetic acid (25 ml.) zinc dust (10 g.) is added and the mixture is heated in an oil bath at 115° overnight. The reaction mixture is cooled and filtered. The solvent is removed and the residue taken up in ether, washed with water, dried and the solvent is removed to yield the title compound as an oil, identical with the compound as described above.

EXAMPLE 4

9$\alpha$ and 9$\beta$, -15$\xi$-dihydroxyprostanoic acid methyl ester (VIIa, VIIb)

To a solution of 9,15-dioxoprostanoic acid methyl ester (0.420 g.) in methanol (6 ml.) is added sodium borohydride (0.157 g.). The reaction mixture is stirred for 30 minutes and diluted with ether. The organic extract is washed with 2–3 ml. of 3% hydrochloric acid, followed by water and saline, dried, and the solvent is removed.

The residual oil is chromatographed on silica gel (Merck, 0.05 mm.–0.2 mm., 25 g.) in 40% ethyl acetate-benzene to yield the title compounds 9$\beta$,15$\xi$-dihydroxyprostanoic acid methyl ester and 9$\alpha$,15$\xi$-dihydroxyprostanoic acid methyl ester characterized by $$\gamma_{max.}^{film} \ 3400, 1725 \text{ cm.}^{-1}$$

and by N.M.R. (CDCl$_3$) spectrography, where 9$\beta$,15-dihydroxyprostanoic acid methyl ester has $\delta$3.94 (1H, ring carbinolic) $\delta$3.71–3.52 (4H, 3 of methoxyl singlet, and 1 carbinolic) and 9$\alpha$,15$\xi$-dihydroxyprostanoic acid methyl ester has $\delta$4.29 (1H ring carbinolic) $\delta$3.72–3.52 (4H, 3 of methoxyl, 1 carbinolic.)

EXAMPLE 5

9,15-dioxoprostanoic acid (VI, R=H)

To a solution of 9,15-dioxoprostanoic acid methyl ester (0.3 g.) in methanol (2 ml.) is added sodium hydroxide solution (0.5 ml., 10%) and the mixture is stirred overnight, under nitrogen atmosphere. The reaction mixture is diluted with ether, and washed with water. The aqueous layer is acidified and reextracted with ether, the ether layer is dried and the solvent is removed to yield 9,15-dioxoprostanoic acid, $$\gamma_{max.}^{film} \ 3200, 1728, 1700 \text{ cm.}^{-1}$$

EXAMPLE 6

9$\alpha$,15$\xi$-Dihydroxyprostanoic acid (VIIa and VIIb)

To a solution of 9$\alpha$,15$\delta$-dihydroxyprostanoic acid methyl ester (0.085 g.) in methanol (2 ml.) there is added 0.2 ml. of sodium hydroxide solution (10 percent) and the mixture is stirred overnight at room temperature. The reaction mixture is diluted with ether, to remove non-acidic material. The aqueous layer is acidified with 10 percent hydrochloric acid and extracted with ether. The ether layer is dried and the solvent is removed, to yield 9$\alpha$,15$\delta$-dihydroxyprostanoic acid (VIIa, R=H), crystallized from acetone-hexane to M.P. 97–8° C., $$\gamma_{max.}^{film} \ 3375, 1700 \text{ cm.}^{-1}$$

In a similar manner as described above 9$\beta$,15$\delta$-dihydroxyprostanoic acid methyl ester is hydrolyzed to the corresponding 9$\beta$,15-dihydroxyprostanoic acid which is obtained as an oil with $\gamma_{max}$ 3378, 1700 cm.$^{-1}$.

We claim:
1. 7-hexanoyl-6 - chloro - 2 - oxo[cis]bicyclo-[3,2,0]-heptane-1-heptanoic acid methyl ester.

References Cited
UNITED STATES PATENTS 3,671,570    6/1972    Bagh et al. _____ 260—468

LORRAINE A. WEINBERGER, Primary Examiner

R. GERSTL, Assistant Examiner

U.S. Cl. X.R.

260—468 D, 514 D, 514 G